United States Patent

[11] 3,577,678

[72] Inventor Robert Edward Burton
         Willits, Calif.
[21] Appl. No. 850,178
[22] Filed Aug. 14, 1969
[45] Patented May 4, 1971
[73] Assignee Microphor, Inc.
         Willits, Calif.

[54] COMBINED WASTE TREATMENT AND GROWTH CHAMBER PROCESS
10 Claims, 2 Drawing Figs.

[52] U.S. Cl. .................................................. 47/58,
         210/3, 210/11, 47/17
[51] Int. Cl. ..................................................... A01g 9/18,
         C02c 1/02
[50] Field of Search........................................... 47/1, 1.4,
         17, 58; 210/3, 11; 195/1

[56] References Cited
UNITED STATES PATENTS

| | | | |
|---|---|---|---|
| 3,195,271 | 7/1965 | Golueke et al. ................ | 47/1.4 |
| 3,218,758 | 11/1965 | Konikoff ....................... | 47/1.4 |
| 3,238,124 | 3/1966 | Burton ......................... | 210/3 |
| 3,420,739 | 1/1969 | Bongers et al. ............... | 47/1.4X |
| 3,462,360 | 8/1969 | McKinney .................... | 47/1.4X |

Primary Examiner—Robert E. Bagwill
Attorney—Flehr, Hohbach, Test, Albritton & Herbert

ABSTRACT: A hermetically sealed combination of a liquid waste treatment system, of a type that utilizes aerobic microorganisms for consumption of waste and production of carbon dioxide as a byproduct, and a growth chamber, such as a conventional greenhouse, for the commercial growth of valuable plants which utilize carbon dioxide for photosynthesis. The waste treatment system preferably includes a liquid body-containing bark strips to provide a convenient place for microbiological activity. A gas circulation system connects the air in the two components.

INVENTOR.
Robert Edward Burton

COMBINED WASTE TREATMENT AND GROWTH CHAMBER PROCESS

BACKGROUND OF THE INVENTION

This invention relates to a substantially hermetically sealed system for treating waste materials while simultaneously promoting the growth of valuable plants.

Various techniques are known for treating liquid wastes to form a product acceptable for discharge (e.g., into streams). For example, in my U.S. Pat. No. 3,238,124 method and means are disclosed for treating waste waters such as sewage and other liquid systems by which separation and removal of colloidal and other organic solids is performed simultaneously with aeration to reduce the biological oxygen demand (BOD) of such waste liquids. Briefly this process involves a distribution of bark fibers in a body of liquid waste material-containing colloidal solids so that the bark is surrounded by the liquid. The bark attracts and holds the colloidal solids and the liquid, separated from the fibers, is circulated over hanging bark fibers to increase the capacity of this circulating liquid to absorb oxygen. Aerobic microorganisms present in the liquid remove the solids from the liquid. Other waste treatment techniques, such as trickling filter and activated sludge systems, mentioned in the above patent, use air-circulatory systems and aerobic microorganisms for the same purposes.

One deficiency of these treatment systems is the requirement of a continuous oxygen supply for the action of the microorganisms on the waste materials. In a conventional approach to supplying oxygen, the system is open to the environment, thus emitting offensive odors to the immediate surroundings. It would be desirable to provide an economical oxygen supply so that the treatment system may be hermetically sealed from the environment.

SUMMARY OF THE INVENTION AND OBJECTS

The invention involves the combination of a liquid waste treatment system, of a type which utilizes aerobic microorganisms for consumption of a portion of the waste, and a growth chamber (e.g., a conventional greenhouse) for the commercial growth of valuable plants. Carbon dioxide-enriched air formed as a byproduct in waste treatment system and evaporating water therein is directed to the growth chamber wherein the carbon dioxide and water vapor is converted to oxygen during photosynthesis. Oxygen-enriched air is recycled from the growth chamber to the waste treatment system. I have found that the growth rate of the plants is significantly accelerated by the high carbon dioxide level in the growth chamber. I have further found that the combined closed cycle system may be hermetically sealed from the environment since the carbon dioxide and oxygen levels are regeneratively controlled and water vapor is continuously supplied to the plants. Thus, I have formed a liquid waste treatment system wherein objectionable odors, which otherwise would be emitted to the environment, are minimized and which require practically no maintenance. A further benefit of the air circulation is the continuous elimination of disease-producing spores from the growth chamber.

In one embodiment of the invention, waste liquid, containing colloidal solids, is partially clarified by filtering through a layer of bark fibers on a screen. Then the waste liquid forms a first waste liquid body. The liquid is further clarified by passage through a slot to form a second waste liquid body in which a plurality of bark fiber strips are deposited. In such condition, such fibers attract the colloidal waste solids, apparently by the mechanism of cataphoresis or electrophoresis, following which a portion of the liquid is separated from the fibers and attached colloidal solids. The separated liquid is then circulated over a hanging fiber section, comprising strips of elongated bark fibers characterized by an unusually large surface area in relation to the volume of the strips. The circulated liquid descends along the large surface of these bark fibers in very thin films which require prolonged periods of time (i.e., many minutes) to descend the length of the fibers and again pass into the first liquid body. The net result of the passage through the hanging bark fibers is a substantial increase in the capacity of the circulating liquid to absorb oxygen. Throughout the waste system, aerobic microorganisms continuously consume portions of the waste and produce carbon dioxide. The colloidal solids are caused to adhere to the bark fiber strips in the system to form a convenient place for the reaction of the microorganisms. A portion of the intermixed liquids in the second liquid body preferably are circulated upward and over said suspended fibers, and they also are circulated to the screen of bark fibers for diluting the incoming waste liquid. Carbon dioxide-enriched air is directed to the growth chamber from the treatment system, preferably from the second liquid body. The growth chamber is hermetically sealed and contains a number of growing plants which consume carbon dioxide. Carbon dioxide-depleted air from the growth chamber is preferably recycled to a point above the hanging fibers section.

Other embodiments of the waste treatment portion of my combination invention include enclosed activated sludge systems and trickling filter systems.

It is a general object of the present invention to provide a highly effective means for treating waste waters such as sewage and for separating and removing therefrom colloidal solids.

It is another object of the invention to provide a method and apparatus of the above character in a system hermetically sealed from its environment to minimize odors emitted therefrom.

It is a further object of the invention to provide a simple, economical means for promoting the accelerated growth of disease-free valuable plants by use of carbon dioxide byproducts and water from an enclosed waste disposal system.

It is a still further object of the invention to provide accelerated plant growth which requires minimal maintenance.

Additional objects and advantages of the invention will appear from the following description taken in conjunction with the accompanying drawings.

DETAILED DESCRIPTION OF THE PREFERRED EMBODIMENTS

Figure 1:
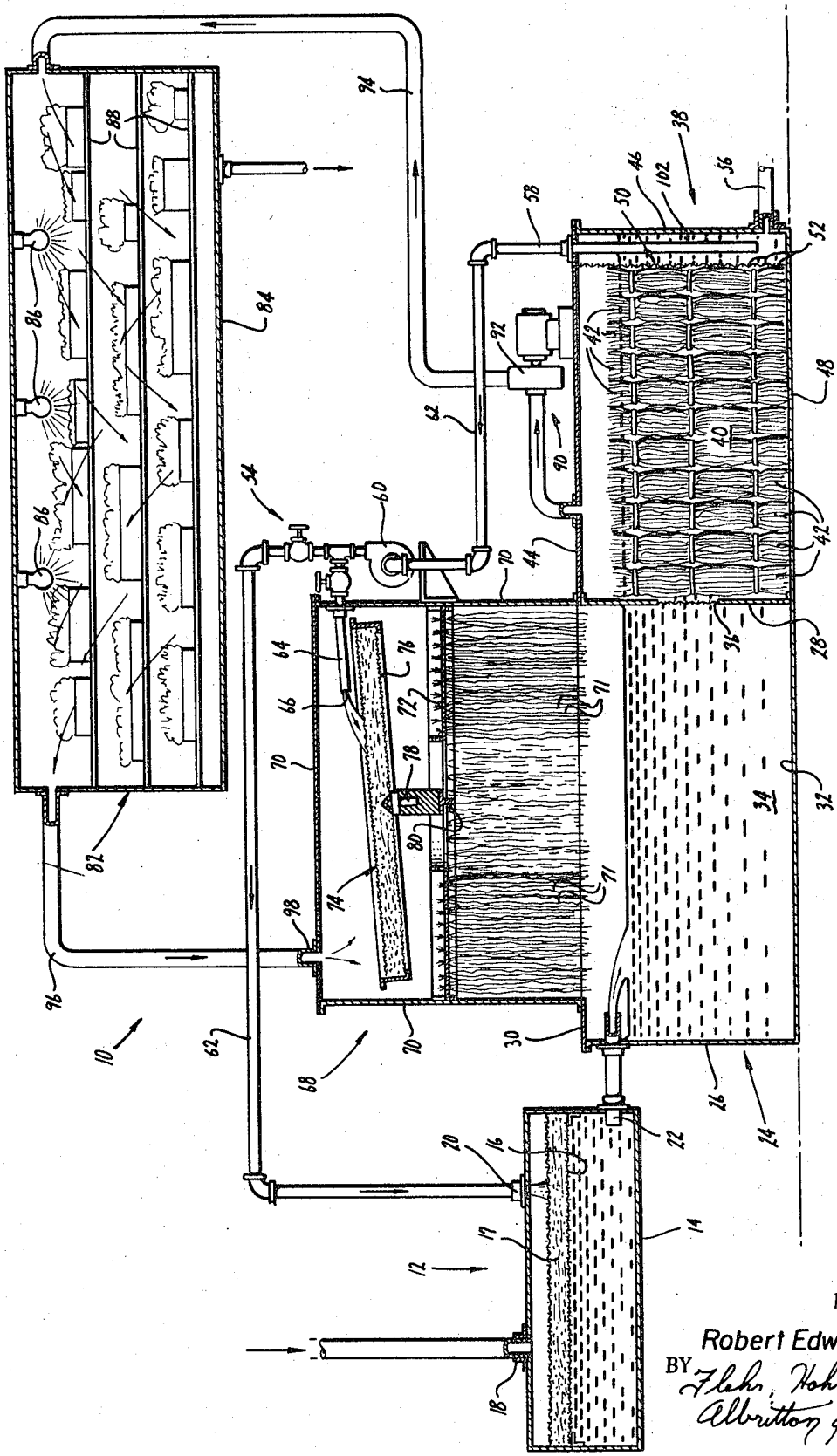
FIG. 1 is a view in longitudinal section illustrating the apparatus of the invention.
Figure 2:
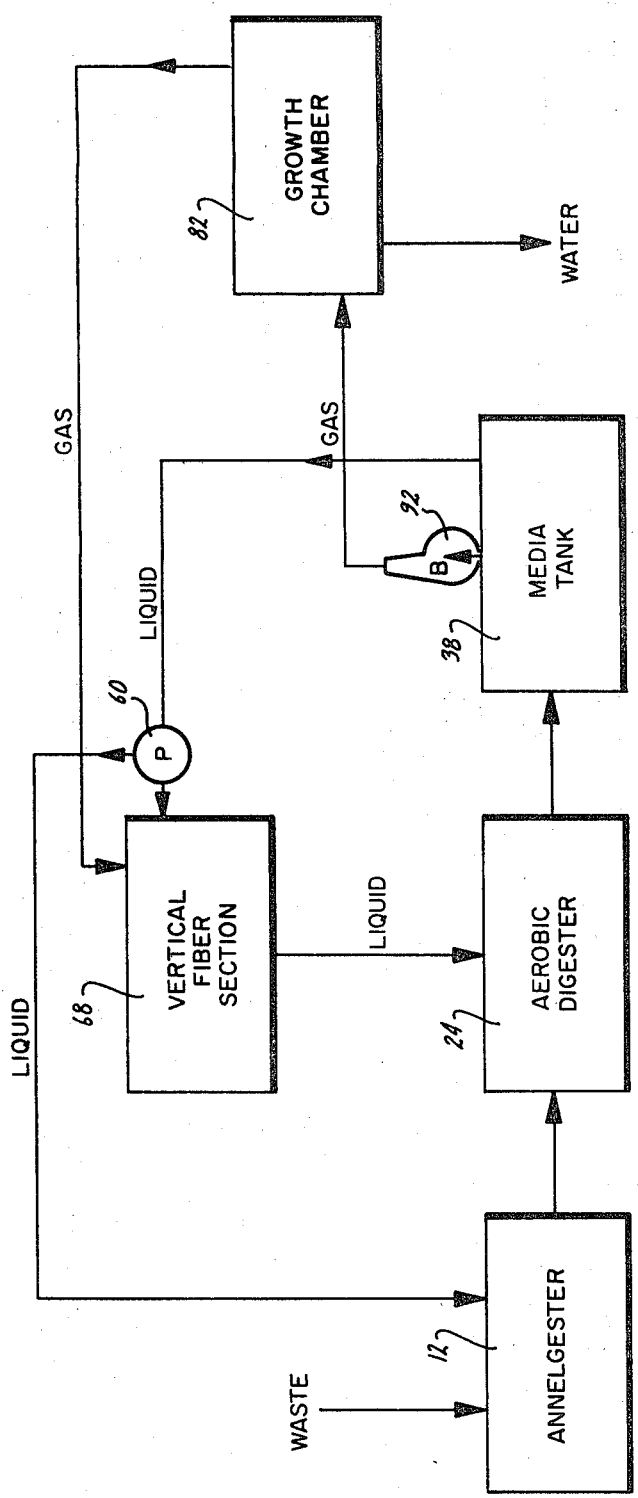
FIG. 2 is a flow sheet illustrating the process of the invention.

In general the invention involves the coupling of a waste treatment system with a growth chamber. One embodiment of a treatment system that may be employed is described in my U.S. Pat. No. 3,238,124, incorporated herein by reference. Another embodiment is illustrated in FIG. 1 and involves a number of modifications to the specific structure and process employed in the aforementioned patent. However, the general principles disclosed therein are equally applicable to this modification. Particular reference is made to the descriptions therein of the types of waste that may be processed, the detailed description of the attraction between colloidal solids and bark fibers, the action of the microbiological community, and the aeration effect of the vertical fiber section.

As illustrated in the embodiment in FIG. 1, an essentially hermetically sealed, waste-treatment system 10 is provided which is dimensioned in accordance with the capacity requirements. The waste-treatment system contains an "annelgester" section 12 defined herein as a bark fiber screening container. The annelgester is suitably formed of an elongated, horizontal, cylindrical housing means 14, a horizontal supporting screen 16 disposed in the housing and adapted to carry a layer of bark fibers 17 while permitting passage therethrough of waste particles under a certain size, inlet 20 also above the screen for spraying waters on the bark fibers recycled from a point downstream in the system, as described hereinafter, and a discharge outlet 22 leading from a point below screen 16 to an "aerobic digester" section 24. The digester, suitably formed of sidewall means 26 and 28, and top and bottom wall means 30 and 32, is adapted to enclose a body of waste liquid 34. Wall 28 contains an opening slot adjacent to a central portion of liquid body 34 for liquid flow from the digester. The slotted wall is adapted to partially clarify liquid flow by holding back settled and floating solids, below and above the slot, respectively. The partially clarified liquid flowing through the slot proceeds into "media tank" section 38 and forms a second liquid body 40 in which are disposed a plurality of bundles of self-supporting fiber strips 42. The media tank is suitably formed of wall means 44, 46 and 48 and on its fourth sidewall means 28, in common with digester 24. A barrier means 50 containing notched openings 52 for liquid flow therethrough is provided to protect the liquid circulatory system 54, to be described hereinafter. An outlet 56 is provided in the media tank for ultimate disposal of reclaimed water. The circulatory system includes an outlet piping 58 leading form liquid body 40 to pump 60 from which a portion of the liquid dilutes and partially dissolves the solid waste on screen 16. The remainder of the liquid emitted from pump 60 is fed through pipe 64 into inlet 66 of a "vertical fiber" section 68, which is formed of its three exposed sides by suitable wall means 70 and is open on its lower side. The liquid flow through inlet 66 causes a revolution of tilted distribution tray means 74 containing a perforated bottom 76 adapted to permit a sprinkling flow through the tray. The tray is rotatably mounted on shaft 78 which, in turn, is supported by bracing means 80. Bark fibers 71 are suspended from the top of section 68 in spaced relation above liquid body 34, preferably by attaching, as by stapling, to brace support 72.

Referring to FIG. 1, a growth chamber 82 is provided having suitable wall means 84 such as a horizontal elongated cylinder for enclosing plants. Lighting means 86 is placed above supporting shelves 88 for the plants. A conventional gaseous circulatory system 90 is formed to transfer air between the treatment system 10 and the growth chamber 82. The system includes a typical blower 92 to direct air suitably from the media tank via piping 94 to the growth chamber and to direct air from the growth chamber through piping 96 to gaseous inlet 98 of the vertical fiber section.

My process is best described by reference to a particular waste liquid undergoing treatment, for example raw waste sewage, canning waste, or the like material contaminated with organic colloidal solids. The contaminated liquid containing both liquid and gross solids, enters the treatment system 10 through annelgester inlet 18 and falls onto bark fiber layer 17 on screen 16. The fibers are substantially individualized bark fibers, particularly redwood bark fibers obtained from customary lumber or mill operations. While these short fibers may be obtained from various commercial sources, particularly satisfactory sources are disclosed in U.S. Pat. Nos. 3,042,977 and 3,238,124. The layer of fibers is suitably on the order of 3 to 4 inches thick. Recycle water is fed through piping 62 to form a spray which dilutes and partially dissolves the waste material. As explained herein, a microbiological community containing aerobic microorganisms is preferably present in the annelgester as well as the remainder of the system. Sources of these microorganisms include the waste material itself, the recycle water, and deliberate seeding of the treatment system. The colloidal solids in the waste material are attached to and become attached to the bark fibers permitting a partial separation of the solids from the liquid which then flows through the screen to form a liquid layer at the bottom of the annelgester which flows out discharge outlet 22 when the liquid level therein is sufficiently high. The aerobic microorganisms attack the liquid and solid wastes to form oxygen and water as a byproduct according to the following simplified equation:

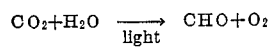
(2)

The above reaction takes place throughout the entire waste-treatment system 10 as will be explained hereinafter. It is noted that the bark fibers provide a convenient resting and breeding place for the aerobic microorganisms (e.g., bacterial and crustacea) and serve to prevent their being swept through the tank by the liquid flow. Annelgester 12 performs a preliminary partial clarification of the incoming waste.

In aerobic digester 24, a further clarification is performed by two means: the action of the microbiological community present throughout the system and via the placement of slot 36. A portion of the solids less dense that the liquid float above the slot while a settleable portion of the solids sink to the bottom of the tank below the slot. Therefore, only a central further clarified water portion is allowed to proceed into media tank 38. The waste fluid proceeds through slot 36 into media tank 38 wherein the colloidal particles are attracted to the bark fiber strips 42 in more-or-less continuous fashion until the space around an individual fiber is substantially covered by the colloidal micelles. Source of these strips is disclosed in the aforementioned patents. If the attraction phenomena were to continue without interruption, for example for a period of a few days or weeks, the suspended fibers would soon become clogged with colloidal solids. To prevent this, the present invention makes use of the microbiological community briefly mentioned above which is introduced to the body of liquid 40 in the media tank and maintained therein throughout the operation of the waste disposal system. The microbiological community (e.g., bacteria paramecium, etc.) may be naturally present in the waste liquid or artificially introduced. In accordance with the invention, the microbiological community is comprised of aerobic microorganisms which serve to renew the fibers for continued use in the separation process. More specifically, the microorganisms digest the colloidal solids attached to the bark fibers thereby permitting the fibers to again attract the colloidal solids in a continuous cycle. In this way, a virtually complete separation of colloidal contaminants from the entering waste liquid can be obtained due to the effect of the aerobic microorganisms and the extensive surface area presented to the entering liquid by the bark fibers. Moreover, as is well known, the aerobic microorganisms produce an effluent which is not foul and are effectively used in my system to permit a direct discharge of waste effluent from the system through the discharge outlet 56 to streams or into soil areas where dilution is not easily practiced or desirable.

As is well known, all existing aerobic processes require the presence of substantial amounts of dissolved oxygen in the water or aqueous medium employed. However, waste liquids such as sewage, canning waste and the like are notably deficient in dissolved oxygen, and are characterized by a substantial biological oxygen demand (BOD). In the practice of the present invention, this biological oxygen demand is satisfied or reduced by the technique of circulating effluent from the media tank over the vertical fiber section 68, positioned above the media tank. The unique structure of the vertical fiber section serves to effectively increase the dissolved oxygen in the circulating effluent, so that it contains sufficient dissolved oxygen to maintain the microbiological community in the media tank U.S. Pat. No. 3,238,124.

Again referring to the apparatus of FIG. 1, the fiber bundles in media tank 38 are first separated from the liquid therein by barrier means 50 which may consist of a grill with openings 52 or other suitable means such as wire mesh screen. The effluent from the media tank is then conveyed from an intermediate discharge zone 102 by means of pump 60 to the vertical fiber section 68, wherein the liquid is fed to tray 74 which is rotated under the force of gravity on the liquid to form s substantially uniform spray over the vertical fibers through perforations 76. One detailed embodiment of such a tray is illustrated in U.S. Pat. No. 3,407,935. From the tray, the effluent (now freed of the colloidal solids) is splashed over the vertical fiber section and descends along the exposed surface of the profusion of individual fibers which make up the bark strips 104 in the vertical fiber section. Details of the bark fiber structure and its operation to restore the oxygen required by the microbiological community throughout the system is described in U.S. Pat. No. 3,238,124.

Referring to FIG. 1, air having a high carbon dioxide and water vapor content is directed from a suitable portion of the waste treatment system such as the air layer above the fibers in the media tank, to the growth chamber. The media tank is chosen as the air-bleeding point since, presumably, it is the point of highest microbiological activity and would thus produce the highest concentration of carbon dioxide. The air is drawn through blower 92 at a suitable hydrostatic pressure such as one-fourth inch through piping 94 into the growth chamber wherein the plants grow according to the following simplified photosynthetic reaction:

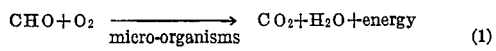

$$CHO + O_2 \xrightarrow{\text{micro-organisms}} CO_2 + H_2O + \text{energy} \quad (1)$$

The air, rich in oxygen is continuously forced from the growth chamber and recycled to the treatment system suitably at the top of the vertical fiber section. This point is chosen for the recycle since it is desirable to supply oxygen-enriched air to the recycling waste liquids being aerated by passage through the vertical fibers. The plants are placed on a series of parallel supporting trays or shelves mounted along the length of the growth chamber wall means. The chamber naturally attains a temperature of about 60° F to 120° F, regardless of the surrounding temperatures. Fluorescent lighting means, such as "Grolux" lights produced by Sylvania, are provided above the plants to catalyze photosynthesis. For strictly vegetative growth in the chamber (in contrast to reproductive growth), the plants may grow 24 hours a day. Various types of green plants exhibit remarkably accelerated growth rate in the chamber, primarily because of the high carbon dioxide content therein. For example, the commercially valuable rhododendrons, azaleas, and begonias may be grown from small plants or cuttings. Leafy vegetables, such as lettuce grow particularly well in this environment. Also the accelerated growth rate of conifer cuttings, such as hedge trimmings dipped in hormone and placed in sand, is quite exceptional. Plants are replaced in the growth chamber when they become marketable. As illustrating the accelerated growth in the chamber, begonia root buds are marketable in three months, about 35 days earlier than if grown under standard conditions.

As briefly described above, it is the high carbon dioxide content in the growth chamber that accelerates the growth rate of the plants. In an open environment, carbon dioxide would normally vary from about 375—450 p.p.m. (in a city street) to about 250 p.p.m. (in an isolated mountain meadow). Most of the surrounding air has a carbon dioxide content on the order of 270—280 p.p.m. I have found that the growth rate of plants in my chamber doubles in approximately 800-—1200 p.p.m. and that unfavorable effects won't occur until a carbon dioxide content on the order of 3,000 p.p.m. In view of these factors, it is desirable to maintain the carbon dioxide level in the growth chamber from about 800 to about 3,000 parts per million. Since the plants utilize the carbon dioxide during photosynthesis, the air recycled to the waste treatment system has a decreased carbon dioxide content.

In addition to the benefit of accelerated plant growth, the present invention enables a waste treatment system to be economically isolated from the surroundings to control the emission of potentially obnoxious odors therefrom. By completely enclosing a typical waste treatment system, the entire oxygen supply therein would be consumed by the action of the microbiological community in a short period of time (about 2 or 3 hours). Since the enclosed system of the invention operates independently of its environment, it could be used under water, at extreme temperatures, or even on a desert without adversely affecting either the treatment of waste or the accelerated plant growth.

A further unexpected benefit from the continuous recycle of air through the growth chamber is the extremely healthy plants produced therein. One reason for this is the lack of insect infestation due to the closed cycle system. In addition, the only airborne spores in the system are introduced when the plants are placed in or removed from the growth chamber. Since the air is cycled on the order of about every 3 minutes the airborne spores would be removed by air passing through the vertical fiber section (which acts as a scrubber).

The air in the growth chamber naturally attains an extremely high relative humidity (e.g., 85—95 percent). The air fed to the growth chamber is drawn from a layer of air above liquid in the media tank and, hence has a high water vapor content. When this air is introduced into the growth chamber, it is condensed on the leaves of the plants and absorbed therein. Since the humidity is so high in the chamber, the plants lose only minimal amounts of water during transpiration normally the major drain on the plants' water content. With humidity approaching 100 percent, there is practically no need to water the plants, since plant growth is supported by water absorbed by the leaves. Another effect of the high relative humidity is the condensation of the water vapor on the growth chamber wall means which may be collected as distilled water at the bottom of the chamber since the walls are cylindrical in shape.

In a typical operation of the invention, involving a relatively small domestic waste treatment installation (capacity sufficient to treat the waste effluent from a normal family), the system of apparatus shown in FIG. 1 may be dimensioned as follows: Aerobic digester in media tank—8 feet long by 4 feet high by 4 feet wide; vertical fiber section—4 feet high by 3½ feet in diameter; annelgester section—8 feet long by 1½ feet in diameter; growth chamber section—10 feet long by 8 feet in diameter. The growth chamber may contain three shelves on the side with (Grolux) lighting over each shelf. In the treatment of waste by this system, effluent may be introduced into the annelgester 12 onto a layer of bark fiber about 4 inches thick. Recycle from pump 60 is fed to the annelgester through pipe 62 at the rate of 3 to 6 gallons per minute and sprayed onto the screen to dilute and partially dissolve the waste material. The entering liquid has a biological oxygen demand (BOD) ranging from about 100 to 900 p.p.m., a dissolved oxygen content of approximately zero, and visual clarity (by light conduction techniques ranging from 0 to 5). As the diluted waste material passes through the annelgester, a portion is retained by the bark fibers therein and removed by action of aerobic microorganisms. The partially clarified liquid is then fed to the aerobic digester 24 for further clarification by aerobic microorganisms. A still further clarification is performed by wall 28 retaining settled and floating solids in the aerobic digester while a central portion of the liquid proceeds to the media tank 38. In the media tank, still further clarification is performed since the colloidal particles are held by the bundles of fiber strips 40 and removed permitting the further clarified water to pass barrier means 50 whereat most of the liquid (about 35 to 40 gallons per minute) is recycled through pump 60 from which the liquid is split into two portions. As previously discussed, 3 of the 6 gallons per minute proceed to the annelgester; the remaining and major portion of the liquid from pump 60 proceeds through the vertical fiber section 70 and returns to aerobic digester 24 and again to media tank 38. The effluent discharged at outlet 56 is sufficiently clarified to permit discharge into the soil or into adjacent streams. The BOD of the treated discharge liquid (measured at outlet 56 in FIG. 1) is a maximum of about 5 to 15 and approaches 0. As an indication of the amount of treatment for home waste, the ratio of recycle to waste is about 50:1. Blower 92 maintained at about ¼-inch hydrostatic pressure, forces air of a composition to enable the growth chamber to operate at a carbon dioxide level of about 1,300 p.p.m. or even higher. The air is subsequently forced through the growth chamber through pipe 96 into the vertical fiber section 68. A complete cycle of air proceeds through the growth chamber once every 3 or 4 minutes. The relative humidity in the growth chamber is naturally maintained at about 100 percent resulting in condensation and absorption in the leaves of the plant and on the walls of the growth chamber. About 20 gallons per day for distilled water may be collected from this latter condensation.

Many variations are possible in the processing, generally described above, and in the use of the apparatus disclosed herein. For example, by harnessing the natural thermodynamic cycle of the closed-system process, this system could be used in the heating and cooling of houses. A brief explanation of this thermodynamics follows. Throughout the waste treatment system, metabolic heat is generated resulting in the heating of the water in the system with the production of a certain amount of water vapor above the liquid. This heated water could be used in the heating (or cooling) of a house. The water vapor-containing latent heat of vaporization is sent from the waste system to the growth chamber wherein a certain amount of condensation occurs on the walls of the growth chamber by absorption of heat from the surroundings. This phenomenon could be used in a cooling (or heating) system for a house.

In a further modification, the system may be substantially increased in size to treat industrial and apartment house waste. In fact, a whole community might be serviced by utilizing a large ship (e.g., the "Queen Mary"). Growing plants may be placed in the rooms of the ship while a waste treatment system, of the type disclosed herein, could be housed in the hold of a ship. The waste treatment would produce substantially no objectionable odors to decrease the effective use of the rest of the ship. A further modification of the present invention would be to employ a different waste treatment system, such as an enclosed activated sludge system. Some of the water overflows the tank while the settleable solids sink to the bottom and are consumed by the aerobic microorganisms present therein. This waste treatment system could replace the system disclosed herein by covering the tank and forming a circulation connection between the tank and the growth chamber of the invention. A typical open activated sludge system is produced by Smith & Lovelace Company. In like manner, a trickling filter system such as produced by Dow Chemical Company may be employed as the waste treatment system of the invention. In such a system, water is fed over a media or rocks on which slime is formed into which is fed a supply of air. The liquid proceeds over the medium and the slime acts on the particles in the waste liquid. By enclosing such a trickling filter and interconnecting it with the growth chamber of the invention, still another variation is formed.

In summary, the process and apparatus of the present invention, combining a waste treatment system with a growth chamber, produces a synergistic effect. The growth rate of valuable plants in the growth chamber is accelerated while enabling the entire system to be sealed from the environment, thereby preventing the emission of obnoxious odors. The system is economical to install and operate. Once installed, it requires practically no maintenance even to the extent of eliminating the necessity of watering the plants in the growth chamber.

I claim:
1. In a substantially hermetically sealed method for separating organic and other solid waste materials from waste liquids while simultaneously promoting the accelerated growth of valuable plants, the steps of forming an aqueous separation medium, enclosing a number of plants in an air environment in a growth chamber, maintaining said chamber under light and heat conditions favoring photosynthesis, circulating an oxygen-containing gas through said medium, introducing the waste liquid containing suspended solid waste into said medium in the presence of aerobic microorganisms consuming a portion of said solids and releasing carbon dioxide to an air layer above said medium, directing the carbon dioxide-enriched air in said layer to said growth chamber wherein a portion of the carbon dioxide is consumed during photosynthesis of the plants and simultaneously directing air of a lower carbon dioxide content from said chamber to said medium.

2. A method as in claim 1 wherein said solid waste materials are colloidal sewage wastes.

3. A method as in claim 1 wherein said liquid medium includes bark fiber strips to which said colloidal solids are attracted and caused to adhere and separate from the liquid in areas whereat the biochemical reaction between said solids and microorganisms occurs.

4. A method as in claim 1 wherein said separation medium is an activated sludge system wherein the circulation of said oxygen-containing gas is performed by forcing air under pressure through said system.

5. A method as in claim 1 wherein said separation medium comprises a trickling filter of rocks covered with slime over which the waste liquids pass.

6. A method as in claim 1 wherein the carbon dioxide level is at least 700 parts per million and the relative humidity approaches 95 percent.

7. In a continuous substantially hermetically sealed method for separating organic and other solid waste materials from waste liquid while simultaneously promoting the accelerated growth of valuable plants, the steps of forming an aqueous liquid medium, enclosing a number of plants in an air environment in a growth chamber, maintaining said chamber under light and heat conditions favoring photosynthesis, circulating an oxygen-containing gas through said medium, continuously introducing the waste liquid-containing suspended solids into said medium in the presence of aerobic microorganisms consuming a portion of said solids and releasing carbon dioxide to an air layer above said medium, continuously directing the carbon dioxide-enriched air to said growth chamber wherein a portion of the carbon dioxide is consumed during photosynthesis of the plants and simultaneously directing air of a lower carbon dioxide content from said chamber to said medium.

8. In a continuous substantially hermetically sealed method for separating organic solids, including colloidal solids from waste liquids while simultaneously promoting the accelerated growth of valuable plants, the steps of forming an aqueous liquid body, depositing a plurality of bark strips in said body, enclosing a plurality of plants in an air environment in a growth chamber, maintaining said chamber under light and heat conditions favoring photosynthesis, circulating an oxygen-containing gas through said liquid, body, continuously introducing the waste liquids-containing suspended colloidal solids into said system in the presence of aerobic microorganisms to cause a biochemical reaction to remove the colloidal solids from the bark strips in said liquid to permit the renewed use of said fibers in attracting colloidal solids, said reaction releasing carbon dioxide to an air layer above said medium, directing the carbon dioxide-enriched air to said growth chamber wherein a portion of the carbon dioxide is consumed during photosynthesis of the plants and simultaneously directing air with a lowered carbon dioxide content from said chamber to said liquid body.

9. In a substantially hermetically sealed method for separating organic and other solid waste materials from waste liquids while simultaneously promoting the accelerated growth of valuable plants, the steps of forming a first aqueous body, forming a second aqueous liquid body in liquid communication therewith, depositing a plurality of bark fiber strips in said second liquid body, suspending a plurality of bark fiber strips above said first liquid body, enclosing a number of plants in an air environment in a growth chamber, maintaining said growth chamber under light and heat conditions to favor photosynthesis, introducing the waste liquid-containing suspended colloidal solids into said liquid body for partial clarification of liquid, circulating an oxygen-containing liquid through said second liquid body, directing said partially clarified liquid to said second liquid body wherein the colloidal solids are attracted and caused to adhere to said deposited bark strips in the presence of aerobic microorganisms, continuously removing the colloidal solids from the bark strips in said second liquid body to permit the renewed use of said fibers in attracting colloidal solids by means of biochemical reactions therein which release carbon dioxide to an air layer above said second liquid body, circulating a portion of the intermixed liquids in the second liquid body upward and over said suspended fibers whereby said intermixed liquids descend slowly down the surface of said suspended fibers, returning said circulating portion of said intermixed liquids to said first liquid body to effect further intermixing, directing said carbon dioxide-enriched air from said air layer to said growth chamber wherein a portion of the carbon dioxide is consumed during photosynthesis of the plants, and simultaneously directing air of a lowered carbon dioxide content from said chamber to said suspended bark fiber strips.

10. A substantially hermetically sealed apparatus for separating colloidal materials from waste liquids while promoting the accelerated growth of valuable plants comprising: wall means forming a first enclosed reservoir, means for introducing waste liquids into said first reservoir to form a first body of liquid therein, wall means forming a second enclosed reservoir in fluid communication with the first liquid body, thereby forming a second body of water in said second reservoir a plurality of elongated bark fiber strips disposed in a substantially fixed position in said second body of water, means forming an enclosed housing above said first reservoir in fluid communication therewith, means supporting a plurality of suspended elongated bark fiber strips disposed in said housing, a liquid circulatory system in fluid communication with said second liquid body, said circulatory system including both distribution means disposed within said housing and means for conveying liquid from said second liquid body to said distribution means to distribute the liquid circulating from said liquid body onto said suspended bark fiber strips, discharge means leading to a point of discharge outside said second reservoir, growth chamber means for enclosing a plurality of plants in an air environment, said growth chamber including fluorescent lighting means disposed within said chamber means above the plants, a gaseous circulatory system for gaseous communication between the inside of said second reservoir and the inside of said chamber means.